United States Patent [19]

Gautier

[11] Patent Number: 5,027,600
[45] Date of Patent: Jul. 2, 1991

[54] BRAKE BOOSTER WITH RECESSED SHELL RECEIVING MASTER CYLINDER FLANGE

[75] Inventor: Jean-Pierre Gautier, Aulnay sous Bois, France

[73] Assignee: Bendix France, Drancy, France

[21] Appl. No.: 439,077

[22] Filed: Nov. 20, 1989

[30] Foreign Application Priority Data

Nov. 30, 1988 [FR] France .................. 88 15679

[51] Int. Cl.⁵ ................... B60T 11/16; B60T 13/24
[52] U.S. Cl. ........................ 60/593; 92/161; 92/169.1
[58] Field of Search ............ 60/547.1, 593; 92/161, 92/169.1, 146

[56] References Cited

U.S. PATENT DOCUMENTS

| 3,137,361 | 6/1964 | Randol | 92/169.2 X |
| 4,110,985 | 9/1978 | Gordon et al. | 60/593 X |
| 4,455,829 | 6/1984 | Seip | 60/547.1 |
| 4,466,246 | 8/1984 | Furuta et al. | 60/547.1 |

FOREIGN PATENT DOCUMENTS

| 3147556 | 7/1982 | Fed. Rep. of Germany | 92/169.1 |
| 1402328 | 8/1975 | United Kingdom | 92/128 |
| 2062153 | 5/1981 | United Kingdom | |

*Primary Examiner*—Edward K. Look
*Assistant Examiner*—George Kapsalas
*Attorney, Agent, or Firm*—Larry J. Palguta; Ken C. Decker

[57] ABSTRACT

The invention relates to a braking device for a motor vehicle having a bulkhead (1) separating the passenger compartment (5) from the engine compartment (3). The device comprises a master cylinder (7) having a flange (13), via which it is fastened by means of a screw/nut assembly (15) to the front wall of a pneumatic brake booster (9) controlled as a result of the action on a tappet (11) passing through the rear wall of a brake booster, and a mechanism for fastening the device to the bulkhead (1) such that the brake booster (9) is arranged on the same side as the passenger compartment (5). The master cylinder (7) is partially arranged in the passenger compartment (5) and passes through an opening made in the bulkhead (1) for this purpose.

1 Claim, 1 Drawing Sheet

BRAKE BOOSTER WITH RECESSED SHELL RECEIVING MASTER CYLINDER FLANGE

BACKGROUND OF THE INVENTION

The present invention relates to a braking device for a motor vehicle, comprising a master cylinder and a pneumatic brake booster. It is known that motor vehicles using have a bulkhead separating the passenger compartment from the engine compartment. For the sake of greater compactness, there is increasingly less room available in the engine compartment and a braking device comprising a pneumatic brake booster and a master cylinder in line takes up a considerable amount of space.

It was therefore proposed, particularly in U.S. Pat. No. 4,455,829, to arrange the brake booster in the passenger compartment of the vehicle. According to the teaching of this document, sheet-metal lugs are welded to the periphery of the brake booster and are fastened to the bulkhead by means of screws and nuts.

Such a solution, although making it possible to save a little space in the engine compartment, is not entirely satisfactory because it makes the operation of mounting the device in the vehicle more difficult.

Furthermore, it does not make it possible to avoid tearing forces at the fastening of the master cylinder to the brake booster. The sheet metal of the front part of the brake booster must therefore have an appreciable thickness, and reinforcements must be provided inside the brake booster, to prevent any elongation of the brake booster, this being contrary to the manufacturers' requirement to make the components lighter, and increasing its cost.

SUMMARY OF THE INVENTION

It is an object of the invention to overcome these disadvantages.

The invention therefore relates to a braking device for a motor vehicle having a bulkhead separating the passenger compartment from the engine compartment, this device comprising a master cylinder having a flange, via which it is fastened by means of a screw/nut assembly to the front wall of a pneumatic brake booster controlled as a result of the action of a tappet passing through the rear wall of the brake booster, and a means for fastening the device to the bulkhead such that the brake booster is arranged on the same side as the passenger compartment.

According to the invention, the master cylinder is partially arranged in the passenger compartment and passes through an opening made in the bulkhead for this purpose.

Preferably, a recess is formed in the front wall of the brake booster, so as to receive the flange of the master cylinder.

Also preferably, the bulkhead is in contact with that face of the flange opposite the brake booster. It is formed by the screw/nut assembly for fastening the master cylinder to the front wall of the brake booster.

BRIEF DESCRIPTION OF THE DRAWINGS

The invention will now be described by way of example with reference to the accompanying drawings in which.

DETAILED DESCRIPTION OF THE INVENTION

Figure 2:
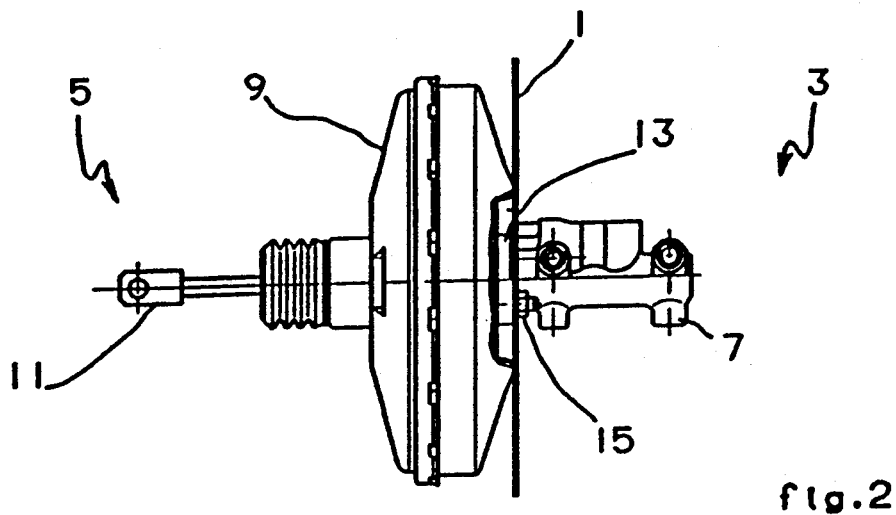
FIG. 2 shows diagrammatically a second embodiment of the invention.

A person skilled in the art will have realized that the terms "front" and "rear" used herein refer to the direction of the vehicle. In the Figures, the front is therefore on the right, towards the engine compartment, while the rear is on the left, towards the passenger compartment of the vehicle. Moreover, a person skilled in the art knows the functioning of pneumatic or vacuum-type brake boosters and of master cylinders, and this functioning will not be described herein.

Referring now to the Figures, the bulkhead 1 separates the engine compartment 3 and the passenger compartment 5 of the motor vehicle. The braking device comprises a master cylinder 7 and a pneumatic brake booster 9 which is controlled as a result of the action of a tappet 11 usually connected to the brake pedal of the vehicle. The master cylinder 7 possesses a flange 13 making it possible to fasten it to the front wall of the brake booster 9 by means of screws and nuts.

In general terms, a rear part of the master cylinder projects slightly into the brake booster 9, so as to ensure a good coaxial positioning of the components of the assembly and to reduce its length.

Figure 1:
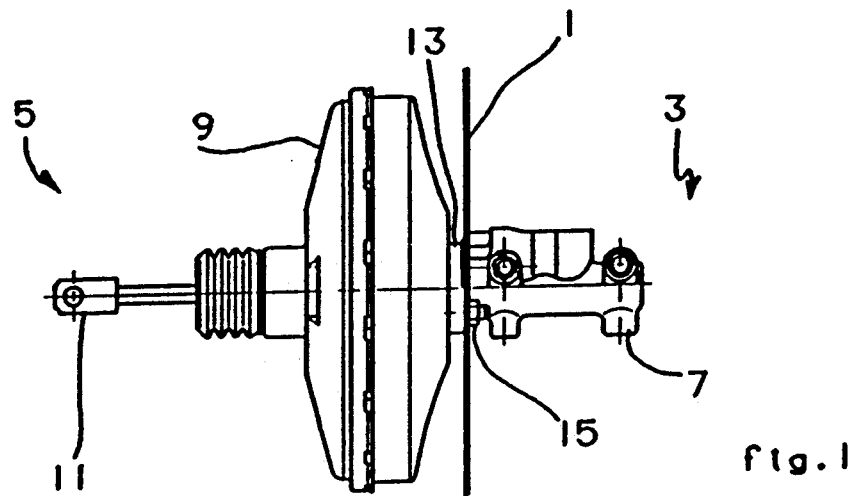
FIG. 1 shows diagrammatically a first embodiment of the invention.
Figure 3:
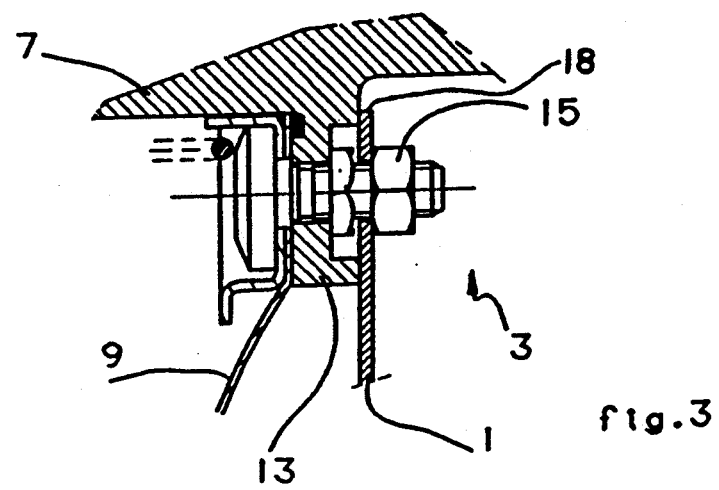
FIG. 3 is an enlarged partial sectional view of a preferred means for fastening the device to the bulkhead.

According to the embodiment illustrated in FIGS. 1 and 3, the means for fastening the device to the bulkhead consists of the screw/nut assembly 15 for fastening the master cylinder to the front wall of the brake booster 9, the bulkhead 1 being retained between that face of the flange 13 opposite the brake booster and at least one nut provided for this purpose.

The master cylinder 7 is thus partially arranged in the passenger compartment 5 and passes through an opening 18 made in the bulkhead 1 for this purpose.

The main objects sought after, namely the reduction in the overall size of that part of the device located in the engine compartment, are thus achieved.

Furthermore, the brake booster 9 is now subjected only to the force exerted on the tappet 11 by the driver of the vehicle and no longer tends to be elongated, since its part subjected the most to the tearing forces bears on the bulkhead. It is therefore no longer necessary to provide reinforcements inside the brake booster which can thus be made considerably lighter and even be produced from plastic or superfine sheet metal. Finally, since the brake booster is no longer liable to elongation, the travel of the actuating pedal decreases in proportion.

To reduce the overall size of that part of the device located in the passenger compartment, according to FIG. 2 a recess is formed in the front wall of the brake booster, so as to receive the flange 13 of the master cylinder 7. In fact, a person skilled in the art knows that the stroke of the piston arranged inside the brake booster 9 is limited by the presence of a restoring spring resting on the inner face of the wall of the brake booster. Such a recess provides, within the brake booster, an annular zone which allows the restoring spring to perform its function appropriately inside the brake booster, the stroke of the inner piston of the brake booster not being impeded if a maximum brake force is applied to the tappet of the brake booster by the driver.

If the shape of the master cylinder makes it impossible for the opening 18 made in the bulkhead to allow the device to pass through and be sufficiently small so that the device can be fastened to the bulkhead by means of screws and nuts fastening the master cylinder to the front wall of the brake booster, according to an alternative version of the invention the means for fastening the device can consist of another screw/nut assembly arranged at a suitable distance from the axis of the device, at the periphery of the above-mentioned opening made in the bulkhead.

In order to reduce the overall size of the part projecting into the engine compartment, the fastening means can comprise a spacer making it possible to distance the front wall of the brake booster from the bulkhead, or a protuberance can be formed on the front wall of the brake booster. In this case, the spacer will have a length or the protuberance a height which is at least equal to the thickness of the flange 13.

Of course, a person skilled in the art will be able to make many modifications to the present invention, without departing from the scope of the invention.

For example, since the braking device according to the invention is no longer subjected to tearing forces at its fastening point, the means for fastening the device can comprise matching fastening members capable of fitting into one another irreversibly, such as a rod supported by the device and an opposite hole made in the bulkhead and the edge of which is notched and bent partially away from the rod, and this rod can be formed by an extension of the screw of the assembly for fastening the master cylinder to the front wall of the brake booster.

I claim:

1. In a motor vehicle having a passenger compartment and an engine compartment separated by a bulkhead, a braking device comprising a pneumatic brake booster, a master cylinder having a radially extending flange via which the master cylinder is fastened by means of a screw/ nut assembly to a front wall of said brake booster which is controlled as a result of the action of a tappet passing through a rear wall of said brake booster, and means for fastening said device to said bulkhead such that said brake booster is arranged on the same side as the passenger compartment and said master cylinder is located partially in the passenger compartment and passing through an opening in said bulkhead, the booster having a recess formed in the front wall of the brake booster and receiving seatably said radially extending flange of said master cylinder, said bulkhead being in contact with a face of said flange located opposite said brake booster, and said means for fastening the device to the bulkhead comprising said screw/nut assembly for fastening the master cylinder to said front wall of said brake booster.

* * * * *